United States Patent
Guo

(10) Patent No.: US 12,432,584 B2
(45) Date of Patent: Sep. 30, 2025

(54) COMMUNICATION METHOD AND DEVICE

(71) Applicant: GUANGDONG OPPO MOBILE TELECOMMUNICATIONS CORP., LTD., Dongguan (CN)

(72) Inventor: Li Guo, Allen, TX (US)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 701 days.

(21) Appl. No.: 17/734,998

(22) Filed: May 2, 2022

(65) Prior Publication Data

US 2022/0264343 A1 Aug. 18, 2022

Related U.S. Application Data

(63) Continuation of application No. PCT/CN2020/127143, filed on Nov. 6, 2020.

(60) Provisional application No. 62/932,274, filed on Nov. 7, 2019.

(51) Int. Cl.
*H04W 24/08* (2009.01)
*H04L 5/00* (2006.01)

(52) U.S. Cl.
CPC ........... *H04W 24/08* (2013.01); *H04L 5/0048* (2013.01)

(58) Field of Classification Search
CPC .... H04W 24/08; H04W 76/20; H04L 5/0023; H04L 5/0057; H04L 5/0048; H04L 5/0051
See application file for complete search history.

(56) References Cited

U.S. PATENT DOCUMENTS

| | | | |
|---|---|---|---|
| 2019/0109626 A1 | 4/2019 | Park et al. | |
| 2019/0297603 A1 | 9/2019 | Guo et al. | |
| 2020/0015228 A1* | 1/2020 | Kang | H04W 24/10 |
| 2020/0220631 A1* | 7/2020 | Onggosanusi | H04B 17/327 |

FOREIGN PATENT DOCUMENTS

| | | |
|---|---|---|
| CN | 109417414 A | 3/2019 |
| CN | 109565701 A | 4/2019 |
| EP | 2866366 A1 | 4/2015 |
| WO | WO2017196246 A2 | 11/2017 |

(Continued)

OTHER PUBLICATIONS

Fujitsu, "Scheduling and CQI feedback for URLLC," 3GPP TSG RAN WG1 Meeting #86bis, R1-1608815, Lisbon, Portugal, Oct. 14, 2016, 5 pgs.

(Continued)

*Primary Examiner* — Anez C Ebrahim
(74) *Attorney, Agent, or Firm* — Morgan, Lewis & Bockius LLP

(57) ABSTRACT

Embodiments of the present disclosure provide a communication method and device. The method comprises: the terminal measures at least two CSI-RS resources or SS/PBCH blocks selected from one or more resource settings configured for group-based SINR report; the terminal calculates SINRs of CRIs or SSBRIs corresponding to the selected CSI-RS resources or SS/PBCH blocks according to the measurement results of the selected CSI-RS resources or SS/PBCH blocks and the terminal reports the CRIs or SSBRIs and their SINRs to the network device.

19 Claims, 2 Drawing Sheets

(56) References Cited

FOREIGN PATENT DOCUMENTS

WO      WO2021088989 A1      5/2021

OTHER PUBLICATIONS

Huawei et al., "Beam measurement and reporting using L1-SINR," 3GPP TSG RAN WG1 Meeting #96bis, R1-1903976, Xi'an, China, Apr. 8-125, 2019, 7 pgs.
Guangdong OPPO Mobile Telecommunications Corp. Ltd., International Search Report and Written Opinion, PCT/CN2020/127143, Feb. 7, 2021, 7 pgs.
3GPP TS 38.211 v15.5.0 (Mar. 2019) $3^{rd}$ Generation Partnership Project; Technical Specification Group Radio Access Network; NR; Physical channels and modulation (Release 15), 92 pgs.
3GPP TS 38.212 v15.5.0 (Mar. 2019) $3^{rd}$ Generation Partnership Project; Technical Specification Group Radio Access Network; NR; Multiplexing and channel coding (Release 15), 98 pgs.
3GPP TS 38.213 v15.5.0 (Mar. 2019) $3^{rd}$ Generation Partnership Project; Technical Specification Group Radio Access Network; NR; Physical layer procedure for control (Release 15), 104 pgs.
3GPP TS 38.214 v15.5.0 (Mar. 2019) $3^{rd}$ Generation Partnership Project; Technical Specification Group Radio Access Network; NR; Physical layer procedure for data (Release 15), 103 pgs.
3GPP TS 38.215 v15.5.0 (Jun. 2019) $3^{rd}$ Generation Partnership Project; Technical Specification Group Radio Access Network; NR; Physical layer measurements (Release 15), 16 pgs.
3GPP TS 38.321 v15.5.0 (Mar. 2019) $3^{rd}$ Generation Partnership Project; Technical Specification Group Radio Access Network; NR; Medium Access Control (MAC) protocol specification (Release 15), 77 pgs.
3GPP TS 38.331 v15.5.0 (Mar. 2019) $3^{rd}$ Generation Partnership Project; Technical Specification Group Radio Access Network; NR; Radio Resource Control (RRC) protocol specification (Release 15), 489 pgs.
Guangdong OPPO Mobile Telecommunications Corp. Ltd., EP20885436, Extended European Search Report, Dec. 2, 2022, 12 pgs.
Huawei, HiSilicon, "Enhancements on multi-beam operation", R1-1910074, 3GPP TSG RAN WG1 Meeting #98bis, Chongqing, China, Oct. 14-20, 2019, 18 pgs.
Intel Corporation, "Summary on SCell BFR and L1-SINR", R1-1903650, 3GPP TSG RAN WG1 Meeting #96, Athens, Greece, Feb. 25-Mar. 1, 2019, 21 pgs.

\* cited by examiner

COMMUNICATION METHOD AND DEVICE

CROSS-REFERENCE TO RELATED APPLICATIONS

This application is a continuation application of PCT Patent Application No. PCT/CN2020/127143, entitled "COMMUNICATION METHOD AND DEVICE" filed on Nov. 6, 2020, which claims the priority benefit of U.S. Provisional Patent Application No. 62/932,274 filed on Nov. 7, 2019, all of which are incorporated herein by reference in their entirety.

TECHNICAL FIELD

The present disclosure relates to the field of wireless communication technologies, and more particularly, to a communication method and device.

BACKGROUND

NR (New Radio)/5G (5th Generation) system supports SINR (Signal to Interference Noise Ratio) measurement based on SS/PBCH (Synchronization Signal/Physical Broadcast Channel) blocks or CSI-RS (Channel State Information Reference Signal) resources. The SINR is defined as the ratio between the signal power and the noise power+the interference power.

The 3GPP (3rd Generation Partnership Project) release 15 specification supports group-based L1-RSRP (Layer 1 Reference Signal Received Power) beam report. A UE (User Equipment) can be configured with a resource setting for channel measurement. In resource setting, the UE is configured with a set of NZP CSI-RS (Non-zero-power Channel State Information Reference Signal) resources or SS/PBCH blocks. Each NZP CSI-RS resource or SS/PBCH block is used to represent one transmit beam. The UE is configured to measure the L1-RSRP of those NZP CSI-RS resources or SS/PBCH blocks. Then the UE can report two CRIs (CSI-RS Resource Indicator) or SSBRIs (SS/PBCH Block Resource Indicator) for two selected NZP CSI-RS resources or SS/PBCH blocks. Generally, what the UE reports are the IDs (Identification) of two CSI-RS resources or SS/PBCH blocks that the UE can use the same Rx (Receive) beam or different Rx beams to receive at the same time.

The major use case for group-based beam reporting is multi-TRP (Transmission/reception point) or multi-panel downlink transmission. In a multi-TRP transmission, the gNB (Next generation NodeB) can transmit different PDSCH from different TRP to the same UE simultaneously. In FR2 (Frequency Range 2) system, the UE has to switch to proper Rx beam to receive each PDSCH transmission. To receive the PDSCH transmission from multiple TRPs, the UE shall be able to apply proper Rx beams to buffer them simultaneously and the Tx (Transmit) beams applied on different TRPs should be received by proper Rx beams that can be formulated by the UE simultaneously. To support that, the gNB needs to configure the UE to measure Tx beams from multiple different TRPs. Then the UE reports a set of Tx beam IDs that can be received by the UE simultaneously and each of reported Tx beams is selected from each TRP. In an example gNB with 2 TRPs, the UE can be configured to measure Tx beams from those two 2 TRPs and then report two Tx beam IDs, each Tx beam ID is selected for each TRP. Those 2 reported Tx beams can be received simultaneously. According to the group-based beam reporting, the gNB can use those 2 reported Tx beams to transmit downlink PDSCHs simultaneously to the UE.

The above information disclosed in this Background section is only for enhancement of understanding of the background of the disclosure and therefore it may contain information that does not form the prior art that is already known in this country to a person of ordinary skill in the art.

SUMMARY

The present disclosure provides a communication method and device.

In a first aspect, the present disclosure provides a communication method, which may comprise measuring at least two channel state information reference signal (CSI-RS) resources or synchronization signal/physical broadcast channel (SS/PBCH) blocks selected from one or more resource settings configured for group-based SINR report; calculating signal to interference noise ratios (SINRs) of CSI-RS resource indicators (CRIs) or SS/PBCH block resource indicators (SSBRIs) corresponding to the selected CSI-RS resources or SS/PBCH blocks according to the measurement results of the selected CSI-RS resources or SS/PBCH blocks; and reporting the CRIs or SSBRIs and their SINRs to network device; wherein the interference measurement used for the SINR calculation of each reported CRI or SSBIR is based on the other reported CRIs or SSBIRs.

In a second aspect, the present disclosure provides a terminal, which may comprise a measuring unit configured to measure at least two CSI-RS resources or SS/PBCH blocks selected from one or more resource settings configured for group-based SINR report; a calculating unit configured to calculate SINRs of CRIs or SSBRIs corresponding to the selected CSI-RS resources or SS/PBCH blocks according to the measurement results of the selected CSI-RS resources or SS/PBCH blocks; and a transmitting unit configured to report the CRIs or SSBRIs and their SINRs to network device; wherein the interference measurement used for the SINR calculation of each reported CRI or SSBIR is based on the other reported CRIs or SSBIRs.

In a third aspect, the present disclosure provides a terminal device for performing the method in the above first aspect or any of the possible implementations of the first aspect. In particular, the terminal device includes functional modules for performing the method in the above first aspect or any of the possible implementations of the first aspect.

In a fourth aspect, the present disclosure provides a terminal device, including a processor and a memory; wherein the memory is configured to store instructions executable by the processor and the processor is configured to perform the method in the above first aspect or any of the possible implementations of the first aspect.

In a fifth aspect, the present disclosure provides a computer readable medium for storing computer programs, which include instructions for executing the above first aspect or any of the possible implementations of the first aspect.

In a sixth aspect, the present disclosure provides a computer program product including a non-transitory computer-readable storage medium storing a computer program, wherein the computer program is executable to cause a computer to perform the method in the above first aspect or any of the possible implementations of the first aspect.

According to the communication method of the embodiment of the disclosure, new definitions of L1-SINR calculation for group-based L1-SINR report are specified which can avoid that the transmission using the Tx beam of a first CRI/SSBRI would cause interference to and also experience interference from the transmission using the Tx beam of a second CRI/SSBRI.

This section provides a summary of various implementations or examples of the technology described in the disclosure, however, it is not a comprehensive disclosure of the full scope or all features of the disclosed technology.

BRIEF DESCRIPTION OF THE DRAWINGS

To describe the technical solutions in the embodiments of the present disclosure more clearly, the following will briefly introduce the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

DETAILED DESCRIPTION

Figures 1, 2:
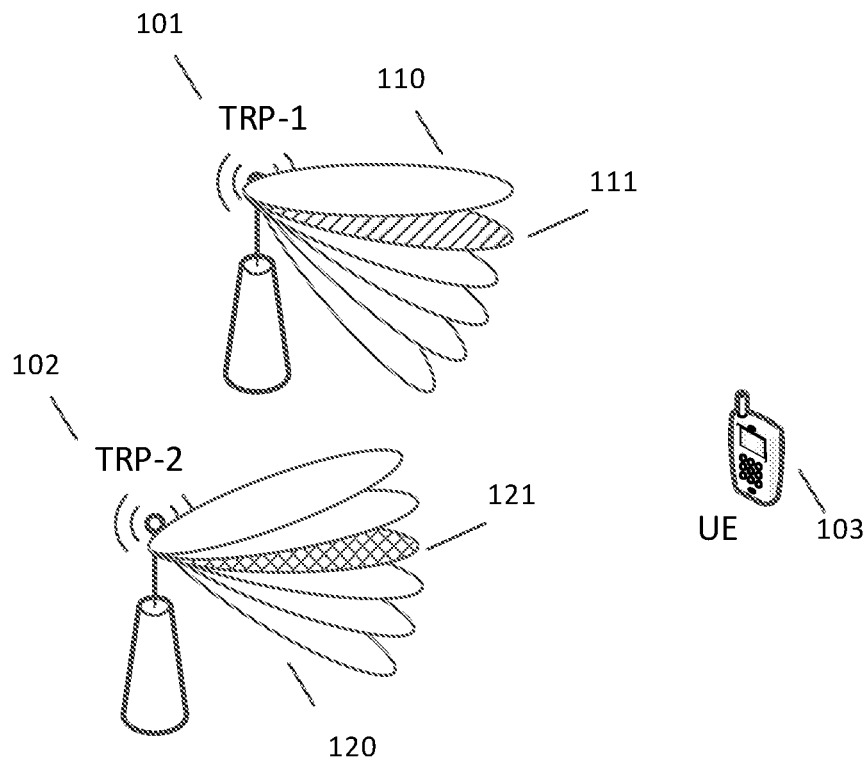
FIG. 1 illustrates an example of group-based beam measurement and reporting.
FIG. 2 schematically illustrates a flowchart of a communication method according to an embodiment of the present disclosure.

Exemplary embodiments of the disclosure will now be described more fully with reference to the accompanying drawings, in which exemplary embodiments are shown. Exemplary embodiments of the disclosure may, however, be embodied in many different forms and should not be construed as being limited to the embodiments set forth herein; rather, these embodiments are provided so that this disclosure will be thorough and complete, and will fully convey the concept of exemplary embodiments to those skilled in the art. Like reference numerals in the drawings denote like elements, and thus their description will be omitted.

The described features, structures, or/and characteristics of the disclosure may be combined in any suitable manner in one or more embodiments. In the following description, numerous specific details are disclosed to provide a thorough understanding of embodiments of the disclosure. One skilled in the relevant art will recognize, however, that the disclosure may be practiced without one or more of the specific details, or with other methods, components and so forth. In other instances, well-known structures, or operations are not shown or described in detail to avoid obscuring aspects of the disclosure.

With reference to the accompanying drawings, a communication method and device provided by the embodiments of the present disclosure will be specifically described below.

It is to be understood that the technical solutions of the present disclosure may be used in various wireless communication systems, for example, Global System of Mobile communication (GSM), General Packet Radio Service (GPRS), Wideband Code Division Multiple Access (WCDMA), High-Speed Packet Access (HSPA), LTE, LTE-Advanced (LTE-A), New Radio (NR) and so on. Furthermore, the communication between a terminal and a network device in the wireless communication network may be performed according to any suitable generation communication protocols, including, but not limited to, the second generation (2G), 2.5G, 2.75G, the third generation (3G), the fourth generation (4G), 4.5G, the fifth generation (5G) communication protocols, and/or any other protocols either currently known or to be developed in the future.

It is to be understood that the term "terminal" refers to any end device that can access a wireless communication network and receive services therefrom. The terminal may include user equipment (UE), which is also referred to as a mobile terminal or mobile user equipment and so on. The user equipment may be a mobile terminal such as a mobile telephone (also referred to as a cellular telephone) or a computer having a mobile terminal such as portable, pocket, hand-held, vehicle-mounted mobile apparatuses or a mobile apparatus with a built-in computer.

It is to be understood that the term "network device" refers to a device in a wireless communication network via which a terminal accesses the network and receives services therefrom. The network device may include a base station (BS), an access point (AP), a Mobile Management Entity (MME), a Multi-cell/Multicast Coordination Entity (MCE), a Access and Mobility Management Function (AMF)/User Plane Function (UPF), a gateway, a server, a controller or any other suitable device in the wireless communication network. The BS may be, for example, a base transceiver station (BTS) in the GSM or the CDMA, or may be a Node B in the WCDMA, or may be an evolutional Node B (eNB or e-NodeB) in the LTE or the LTE-A, or may be a gNB or ng-eNB in the NR, and the present disclosure is not limited thereto.

In current group-based beam reporting, the UE reports the L1-RSRP measurement of each reported CRI/SSBRI. Those two reported CRI/SSBRI can be used by the gNB to transmit downlink channel simultaneously. The definition of L1-SINR calculation for group-based beam reporting is not clearly specified. For non-group-based beam reporting, the L1-SINR of each CRI/SSBRI is calculated based on the interference measured from the IMR associated with the corresponding CMR. That method cannot be re-used for group-based L1-SINR report because the two CRI/SSBRIs reported in group-based L1-SINR report would be used by the gNB simultaneously to transmit downlink channels. Thus, the transmission using the Tx beam of a first CRI would cause interference to and also experience interference from the transmission using the Tx beam of a second CRI. Thus, the pair of CRI/SSBRI reported might not be good choice for downlink transmission. To resolve that issue, new definition of L1-SINR calculation for group-based L1-SINR report shall be specified. Furthermore, the current resource configurations do not support the implementation of configuring the UE to select Tx beams from different TRP, while that is the main use case for group-based beam reporting. Thus, new resource configurations shall be specified for group-based beam reporting.

In one embodiment, for a group-based beam measurement and reporting, a UE can be configured to measure one or more downlink reference signal resources (for example CSI-RS resources or SS/PBCH blocks). The UE can be requested to measure the L1-RSRP of those downlink reference signal resources. The UE can be requested to measure the L1-SINR of those downlink reference signal resources. Then the UE can be requested to report N (for example N=2) IDs of those downlink reference signal resources to the gNB and those N reported downlink reference signal resources can be received by the UE simultaneously. The UE can also report the measurement results along those reported downlink reference signal resource IDs, for example L1-SINR measurement or L1-RSRP measurement. Those N reported downlink reference signal resources are going to be used by the gNB to transmit downlink channels simultaneously. Therefore:

Those reported downlink reference signal resources shall be selected from different gNB transmit unit, for example different TRPs, for example different transmit panels where the Tx beam are formulated separately.

The UE shall consider the interference between those N reported downlink reference signal resources because the gNB is going to use them to transmit downlink channel simultaneously, and thus the transmission stream on one of the Tx beams might cause interference to transmission stream carried in another Tx beam.

An example of group-based beam measurement and reporting is illustrated in FIG. 1. The gNB is connected with two TRPs: TRP-1 101 and TRP-2 102. The gNB configures the UE 103 to measure downlink reference signal resource from two TRPs. The TRP-1 transmits those downlink reference signal resources 110 and the TRP-2 transmits those downlink reference signal resources 120. The UE 103 is configured to measure the downlink reference signal resources 110 and 120. The UE 103 can be configured to measure L1-RSRP. The UE 103 can be configured to measure L1-SINR. Based on the measurement results, the UE 103 reports downlink reference signal resource 111 and downlink reference signal resource 121 to the gNB. According to the report, the gNB can use the Tx beams corresponding to downlink reference signal resource 111 and downlink reference signal resource 121 simultaneously to transmit downlink channel.

One example of use case for group-based L1-RSRP beam report is the gNB can use the reported Tx beams to transmit the same downlink channel/data stream simultaneously to improve the downlink link quality.

One example of use cases for group-based L1-SINR beam report is the reported Tx beams can be used for downlink multi-TRP transmission, where different TRP can use one of those reported Tx beams to transmit downlink PDSCH to the UE.

A UE can be configured with group-based L1-SINR report. The UE is configured to measure M CSI-RS resources or SS/PBCH blocks. For the group-based L1-SINR report, the UE can be requested to report N=2 CRIs or SSBRIs and the L1-SINR measurement of each reported CRI or SSBRI. In calculating the L1-SINR of one CRI or SSBRI, the UE shall consider the interference measurement measured from the other reported CRI or SSBRI. For each reported a first CRI or SSBRI, the corresponding L1-SINR is calculated based on the interference measured from the IMR associated the CMR corresponding to the first CRI/SSBRI, and the interference measured from the IMR associated with the CMR corresponding to a second CRI/SSBRI in the same reporting instance and the interference measured from the CMR corresponding the second CRI/SSBRI, where the UE shall apply the QCL (Quasi Co-location)-type D of the first CRI to measure all those interference.

In some embodiments, for group-based beam reporting with L1-SINR report, a UE can be configured with one resource settings for channel measurement.

In a first example, the UE is configured with one resource setting for L1-SINR report. In the resource setting, the UE is configured with N1 NZP CSI-RS resources for L1-SINR computation. If the UE is configured with group-based beam reporting, the UE can report two CRIs in one L1-SINR report instance: {a first CRI, a second CRI}. For L1-SINR measurement of each reported CRI in group-based beam reporting, the UE assumes:

The NZP CSI-RS resource corresponding to the other reported CRI is used for interference measurement.

The UE may assume to use the QCL-type D configured to the NZP CSI-RS resource corresponding to the CRI to measure the NZP CSI-RS resource corresponding to the other CRI for interference measurement.

Other interference signal on REs (Resource Element) of NZP CSI-RS resource for channel measurement.

For example, the UE reports CRI1 and CRI2 in one group-based beam report L1-SINR instance. The UE calculates the L1-SINR of CRI1 by measuring interference from the NZP CSI-RS resource indicated by the CRI2 and the interference from the interference signal on the REs of NZP CSI-RS resource corresponding to CRI1. On the other hand, the UE calculates the L1-SINR of CRI2 by measuring interference from the NZP CSI-RS resource indicated by the CRI1 and the interference from the interference signal on the REs of NZP CSI-RS resource corresponding to CRI2.

In a second example, the UE is configured with two resource settings for L1-SINR computation. A first resource setting with N1 NZP CSI-RS resources or SSBs is for channel measurement and a second resource setting with N1 CSI-IM resources is for interference measurements. The UE can assume each NZP CSI-RS resource in the first resource setting is associated with one CSI-IM resource in the second resource setting. If the UE is configured with group-based beam reporting, the UE can report two CRIs in one L1-SINR report instance: {a first CRI, a second CRI}. For L1-SINR measurement of each reported CRI in group-based beam reporting, the UE assumes the following interference measurement:

The NZP CSI-RS resource or SSB corresponding to the other reported CRI or SSBRI is used for interference measurement.

The UE may assume to use the QCL-type D configured to the NZP CSI-RS resource corresponding to the CRI to measure the NZP CSI-RS resource corresponding to the other CRI for interference measurement.

Other interference signal on REs of NZP CSI-RS resource for channel measurement.

The CSI-IM for interference measurement associated with the NZP CSI-RS resource for channel measurement.

For example, the UE reports CRI1 and CRI2 in one group-based beam report L1-SINR instance. The UE calculates the L1-SINR of CRI1 by measuring interference from the NZP CSI-RS resource indicated by the CRI2, the interference from the interference signal on the REs of NZP CSI-RS resource corresponding to CRI1 and the interference from the CSI-IM resource associated with the NZP CSI-RS resource corresponding to CRI1. On the other hand, the UE calculates the L1-SINR of CRI2 by measuring interference from the NZP CSI-RS resource indicated by the CRI1 and the interference from the interference signal on the REs of NZP CSI-RS resource corresponding to CRI2, and the interference from the CSI-IM resource associated with the NZP CSI-RS resource corresponding to CRI2.

In a third example, the UE is configured with two resource settings for L1-SINR computation. A first resource setting with N1 NZP CSI-RS resources or SSBs is for channel measurement and a second resource setting with N1 NZP CSI-RS resources is for interference measurements. The UE can assume each NZP CSI-RS resource in the first resource setting is associated with one NZP CSI-RS resource in the second resource setting. If the UE is configured with group-based beam reporting, the UE can report two CRIs in one L1-SINR report instance: {a first CRI, a second CRI}. For L1-SINR measurement of each reported CRI in group-based beam reporting, the UE assumes the following interference measurement:

The NZP CSI-RS resource or SSB corresponding to the other reported CRI or SSBRI is used for interference measurement.
  The UE may assume to use the QCL-type D configured to the NZP CSI-RS resource corresponding to the CRI to measure the NZP CSI-RS resource corresponding to the other CRI for interference measurement.
Other interference signal on REs of NZP CSI-RS resource for channel measurement.
The NZP CSI-RS for interference measurement associated with the NZP CSI-RS resource corresponding to CRI1
The NZP CSI-RS for interference measurement associated with the NZP CSI-RS resource corresponding to CRI2.
  The UE may assume to use the QCL-type D configured to the NZP CSI-RS resource corresponding to the CRI to measure the NZP CSI-RS resource corresponding to the other CRI for interference measurement.

For example, the UE reports CRI1 and CRI2 in one group-based beam report L1-SINR instance. The UE calculates the L1-SINR of CRI1 by measuring interference from the NZP CSI-RS resource indicated by the CRI2, the interference from the interference signal on the REs of NZP CSI-RS resource corresponding to CRI1, the interference from the NZP CSI-RS resource for interference measurement associated with the NZP CSI-RS resource corresponding to CRI1 and the interference from the NZP CSI-RS resource for interference measurement associated with the NZP CSI-RS resource corresponding to CRI2. On the other hand, the UE calculates the L1-SINR of CRI2 by measuring interference from the NZP CSI-RS resource indicated by the CRI1 and the interference from the interference signal on the REs of NZP CSI-RS resource corresponding to CRI2, the interference from the NZP CSI-RS resource for interference measurement associated with the NZP CSI-RS resource corresponding to CRI2 and the interference from the NZP CSI-RS resource for interference measurement associated with the NZP CSI-RS resource corresponding to CRI1.

In a fourth example, the UE is configured with three resource settings for L1-SINR computation. A first resource setting with N1 NZP CSI-RS resources or SSBs is for channel measurement and a second resource setting with N1 NZP CSI-RS resources is for interference measurements and a third resource setting with one CSI-IM resource is for interference measurement. The UE can assume each NZP CSI-RS resource in the first resource setting is associated with one NZP CSI-RS resource in the second resource setting. If the UE is configured with group-based beam reporting, the UE can report two CRIs in one L1-SINR report instance: {a first CRI, a second CRI}. For L1-SINR measurement of each reported CRI in group-based beam reporting, the UE assumes the following interference measurement:

The NZP CSI-RS resource or SSB corresponding to the other reported CRI or SSBRI is used for interference measurement.
  The UE may assume to use the QCL-type D configured to the NZP CSI-RS resource corresponding to the CRI to measure the NZP CSI-RS resource corresponding to the other CRI for interference measurement.
Other interference signal on REs of NZP CSI-RS resource for channel measurement.
The NZP CSI-RS for interference measurement associated with the NZP CSI-RS resource corresponding to CRI1
The NZP CSI-RS for interference measurement associated with the NZP CSI-RS resource corresponding to CRI2.
  The UE may assume to use the QCL-type D configured to the NZP CSI-RS resource corresponding to the CRI to measure the NZP CSI-RS resource corresponding to the other CRI for interference measurement.
Interference measured from the CSI-IM configured in the third resource setting. The UE shall assume to use the QCL-Type D configured to the NZP CSI-RS resource corresponding to the CRI to measure the CSI-IM resource.
For example, the UE reports CRI1 and CRI2 in one group-based beam report L1-SINR instance.
  The UE calculates the L1-SINR of CRI1 by measuring interference from the NZP CSI-RS resource indicated by the CRI2, the interference from the interference signal on the REs of NZP CSI-RS resource corresponding to CRI1, the interference from the NZP CSI-RS resource for interference measurement associated with the NZP CSI-RS resource corresponding to CRI1, the interference from the NZP CSI-RS resource for interference measurement associated with the NZP CSI-RS resource corresponding to CRI2, and the interference measured from the CSI-IM resource in the third resource setting.
  On the other hand, the UE calculates the L1-SINR of CRI2 by measuring interference from the NZP CSI-RS resource indicated by the CRI1 and the interference from the interference signal on the REs of NZP CSI-RS resource corresponding to CRI2, the interference from the NZP CSI-RS resource for interference measurement associated with the NZP CSI-RS resource corresponding to CRI2 and the interference from the NZP CSI-RS resource for interference measurement associated with the NZP CSI-RS resource corresponding to CRI1 and the interference measured from the CSI-IM resource in the third resource setting.

In other embodiments, for group-based beam reporting with L1-SINR report, a UE can be configured with a first and a second resource setting for channel measurement. In each resource setting, the UE is configured with one or more NZP CSI-RS resources or SSBs for channel measurement. In one L1-SINR report instance of group-based beam reporting, the UE can be configured to report one CRI/SSBRI from the first resource setting and one CRI/SSBR from the second resource setting.

In a first example, the UE is configured with two resource settings for channel measurement for L1-SINR computation.

In a first resource setting, the UE is configured with N1 NZP CSI-RS resources and in a second resource setting, the UE is configured with N2 NZP CSI-RS resources. If the UE is configured with group-based beam reporting, the UE can report two CRIs in one L1-SINR report instance: {a first CRI, a second CRI}, where the first CRI is selected from the first resource setting and the second CRI is selected from the second setting. For L1-SINR measurement of each reported CRI in group-based beam reporting, the UE assumes:

- The NZP CSI-RS resource corresponding to the other reported CRI is used for interference measurement.
  - The UE may assume to use the QCL-type D configured to the NZP CSI-RS resource corresponding to the CRI to measure the NZP CSI-RS resource corresponding to the other CRI for interference measurement.
- Other interference signal on REs of NZP CSI-RS resource for channel measurement.
- For example, the UE reports CRI1 and CRI2 in one group-based beam report L1-SINR instance. The UE calculates the L1-SINR of CRI1 by measuring interference from the NZP CSI-RS resource indicated by the CRI2 in the second resource setting and the interference from the interference signal on the REs of NZP CSI-RS resource corresponding to CRI1 in the first resource setting. On the other hand, the UE calculates the L1-SINR of CRI2 by measuring interference from the NZP CSI-RS resource indicated by the CRI1 in the first resource setting and the interference from the interference signal on the REs of NZP CSI-RS resource corresponding to CRI2 in the second resource setting.

In a second example, the UE is configured with two resource settings for channel measurement for L1-SINR computation and one resource setting for interference measurement for L1-SINR computation: a first resource setting with N1 NZP CSI-RS resources or SSBs for channel measurement and a second resource setting with N1 NZP CSI-RS resources or SSBs for channel measurement, and a third resource setting with N1 CSI-IM resources for interference measurements. The UE can assume each NZP CSI-RS resource in the first resource setting is associated with one CSI-IM resource in the third resource setting and the UE assume each NZP CSI-RS resource in the second resource setting is associated with one CSI-IM resource in the third resource setting. If the UE is configured with group-based beam reporting, the UE can report two CRIs in one L1-SINR report instance: {a first CRI, a second CRI}, where the first CRI is selected from the first resource setting and the second CRI is selected from the second resource setting. For L1-SINR measurement of each reported CRI in group-based beam reporting, the UE assumes the following interference measurement:

- The NZP CSI-RS resource or SSB corresponding to the other reported CRI or SSBRI is used for interference measurement.
  - The UE may assume to use the QCL-type D configured to the NZP CSI-RS resource corresponding to the CRI to measure the NZP CSI-RS resource corresponding to the other CRI for interference measurement.
- Other interference signal on REs of NZP CSI-RS resource for channel measurement.
- The CSI-IM for interference measurement associated with the NZP CSI-RS resource for channel measurement.
- For example, the UE reports CRI1 and CRI2 in one group-based beam report L1-SINR instance. The UE calculates the L1-SINR of CRI1 by measuring interference from the NZP CSI-RS resource indicated by the CRI2 in the second resource setting, the interference from the interference signal on the REs of NZP CSI-RS resource corresponding to CRI1 and the interference from the CSI-IM resource associated with the NZP CSI-RS resource corresponding to CRI1 in the first resource setting. On the other hand, the UE calculates the L1-SINR of CRI2 by measuring interference from the NZP CSI-RS resource indicated by the CRI1 in the first resource setting and the interference from the interference signal on the REs of NZP CSI-RS resource corresponding to CRI2 in the second resource setting, and the interference from the CSI-IM resource associated with the NZP CSI-RS resource corresponding to CRI2 in the second resource setting.

In a third method, the UE is configured with four resource settings for L1-SINR computation: a first resource setting with N1 NZP CSI-RS resources or SSBs for channel measurement, a second resource setting with N2 NZP CSI-RS resources or SSBs for channel measurement, a third resource setting with N1 NZP CSI-RS resources or CSI-IM resources for interference measurements and a fourth resource setting with N2 NZP CSI-RS resources or CSI-IM resources for interference measurements. The UE can assume each NZP CSI-RS resource in the first resource setting is associated with one NZP CSI-RS resource or CSI-IM resource in the third resource setting. The UE can assume each NZP CSI-RS resource in the second resource setting is associated with one NZP CSI-RS resource or CSI-IM resource in the fourth resource setting. If the UE is configured with group-based beam reporting, the UE can report two CRIs in one L1-SINR report instance: {a first CRI/SSBRI, a second CRI/SSBRI}, where the first CRI/SSBRI is selected from the first resource setting and the second CRI/SSBRI is selected from the second resource setting. For L1-SINR measurement of each reported CRI in group-based beam reporting, the UE assumes the following interference measurement:

- The NZP CSI-RS resource or SSB corresponding to the other reported CRI or SSBRI is used for interference measurement.
  - The UE may assume to use the QCL-type D configured to the NZP CSI-RS resource corresponding to the CRI to measure the NZP CSI-RS resource corresponding to the other CRI for interference measurement.
- Other interference signal on REs of NZP CSI-RS resource for channel measurement.
- The NZP CSI-RS or CSI-IM resource for interference measurement associated with the NZP CSI-RS resource corresponding to CRI1
- The NZP CSI-RS or CSI-IM resource for interference measurement associated with the NZP CSI-RS resource corresponding to CRI2.
  - The UE may assume to use the QCL-type D configured to the NZP CSI-RS resource corresponding to the reported CRI to measure the NZP CSI-RS resource or CSI-IM resource associated with the other reported CRI for interference measurement.
- For example, the UE reports CRI1 and CRI2 in one group-based beam report L1-SINR instance. The CRI1 is selected from the first resource setting and the CRI2 is selected from the second resource setting:
  - The UE calculates the L1-SINR of CRI1 by measuring interference from the NZP CSI-RS resource indicated by the CRI2 in the second resource setting, the interference from the interference signal on the REs of NZP CSI-RS resource corresponding to CRI1 in the first resource setting, the interference from the NZP CSI-RS resource or CSI-IM for interference measurement associated with the NZP CSI-RS resource corresponding to CRI1 and the interference from the NZP CSI-RS resource or CSI-IM for interference measurement associated with the NZP CSI-RS resource corresponding to CRI2.

On the other hand, the UE calculates the L1-SINR of CRI2 by measuring interference from the NZP CSI-RS resource indicated by the CRI1 and the interference from the interference signal on the REs of NZP CSI-RS resource corresponding to CRI2, the interference from the NZP CSI-RS or CSI-IM resource for interference measurement associated with the NZP CSI-RS resource corresponding to CRI2 and the interference from the NZP CSI-RS resource or CSI-IM resource for interference measurement associated with the NZP CSI-RS resource corresponding to CRI1.

In a fourth method, the UE is configured with five resource settings for L1-SINR computation: a first resource setting with N1 NZP CSI-RS resources or SSBs for channel measurement, a second resource setting with N2 NZP CSI-RS resources or SSBs for channel measurement, a third resource setting with N1 NZP CSI-RS resources or CSI-IM resources for interference measurements and a fourth resource setting with N2 NZP CSI-RS resources or CSI-IM resources for interference measurements. A fifth resource setting is configured with one CSI-IM resource for interference measurement. The UE can assume each NZP CSI-RS resource in the first resource setting is associated with one NZP CSI-RS resource or CSI-IM resource in the third resource setting. The UE can assume each NZP CSI-RS resource in the second resource setting is associated with one NZP CSI-RS resource or CSI-IM resource in the fourth resource setting. If the UE is configured with group-based beam reporting, the UE can report two CRIs in one L1-SINR report instance: {a first CRI/SSBRI, a second CRI/SSBRI}, where the first CRI/SSBRI is selected from the first resource setting and the second CRI/SSBRI is selected from the second resource setting. For L1-SINR measurement of each reported CRI in group-based beam reporting, the UE assumes the following interference measurement:

The NZP CSI-RS resource or SSB corresponding to the other reported CRI or SSBRI is used for interference measurement.
   The UE may assume to use the QCL-type D configured to the NZP CSI-RS resource corresponding to the CRI to measure the NZP CSI-RS resource corresponding to the other CRI for interference measurement.
Other interference signal on REs of NZP CSI-RS resource for channel measurement.
The NZP CSI-RS or CSI-IM resource for interference measurement associated with the NZP CSI-RS resource corresponding to CRI1
The NZP CSI-RS or CSI-IM resource for interference measurement associated with the NZP CSI-RS resource corresponding to CRI2.
   The UE may assume to use the QCL-type D configured to the NZP CSI-RS resource corresponding to the reported CRI to measure the NZP CSI-RS resource or CSI-IM resource associated with the other reported CRI for interference measurement.
The interference measured from the CSI-IM resource configured in the fifth resource setting. The UE may use the QCL-Type D configured to the NZP CSI-RS resource corresponding to the CRI to measure the CSI-IM resource.

For example, the UE reports CRI1 and CRI2 in one group-based beam report L1-SINR instance. The CRI1 is selected from the first resource setting and the CRI2 is selected from the second resource setting:
   The UE calculates the L1-SINR of CRI1 by measuring interference from the NZP CSI-RS resource indicated by the CRI2 in the second resource setting, the interference from the interference signal on the REs of NZP CSI-RS resource corresponding to CRI1 in the first resource setting, the interference from the NZP CSI-RS resource or CSI-IM for interference measurement associated with the NZP CSI-RS resource corresponding to CRI1 and the interference from the NZP CSI-RS resource or CSI-IM for interference measurement associated with the NZP CSI-RS resource corresponding to CRI2, and the interference from the CSI-IM resource for interference measurement.
   On the other hand, the UE calculates the L1-SINR of CRI2 by measuring interference from the NZP CSI-RS resource indicated by the CRI1 and the interference from the interference signal on the REs of NZP CSI-RS resource corresponding to CRI2, the interference from the NZP CSI-RS or CSI-IM resource for interference measurement associated with the NZP CSI-RS resource corresponding to CRI2 and the interference from the NZP CSI-RS resource or CSI-IM resource for interference measurement associated with the NZP CSI-RS resource corresponding to CRI1, and interference from the CSI-IM resource for interference measurement.

The methods for group-based L1-SINR beam measurement and report are presented in this disclosure.

In group-based L1-SINR report, the UE can report one or more pairs of CRIs/SSBRIs along with the L1-SINR for each reported CRI/SSBRI. For each reported CRI/SSBRI, the L1-SINR is calculated based on the interference measurement obtained by measuring the IMR associated with the CSI-RS resource or SS/PBCH identified by the reported CRI/SSBRI and the interference measurement obtained by measuring the CMR identified by the CRI/SSBRI reported in the same report pair with the Spatial Rx parameter configured to the CSI-RS resource identified by the reported CRI.

For group-based L1-SINR report, configure the following resource setting:
   The UE is configured with a first resource setting for channel and interference measurement and a second resource setting for channel and interference measurement. In group-based L1-SINR report, the CRIs in each report pair is chosen from the first resource setting and the second resource setting.
   The UE is configured with a first resource setting for channel measurement and a second resource setting for channel measurement and a third resource setting with N CSI-IM resources for interference measurement. In group-based L1-SINR report, the CRIs in each report pair is chosen from the first resource setting and the second resource setting.
   The UE is configured with a first resource setting with N1 CSI-RS resources for channel measurement and a second resource setting with N1 NZP CSI-RS resources for interference measurement. The UE is configured with a third resource setting with N1

CSI-RS resources for channel measurement and a fourth resource setting with N1 NZP CSI-RS resources for interference measurement. In group-based L1-SINR report, the CRIs in each report pair is chosen from the first resource setting and the third resource setting.

FIG. 2 schematically illustrates a flowchart of a communication method according to an embodiment of the present disclosure. The method may be applied, for example, to a terminal. The terminal may be a UE in NR system.

Referring to FIG. 2, the communication 20 comprises:

In Step S202, the terminal measures at least two CSI-RS resources or SS/PBCH blocks selected from one or more resource settings configured for group-based SINR report.

In Step S204, the terminal calculates SINRs of CRIs or SSBRIs corresponding to the selected CSI-RS resources or SS/PBCH blocks according to the measurement results of the selected CSI-RS resources or SS/PBCH blocks.

Wherein the interference measurement used for the SINR calculation of each reported CRI or SSBIR is based on the other reported CRIs or SSBIRs.

In an embodiment of the present disclosure, there is one resource setting configured for the group-based SINR report and at least two non-zero-power channel state information reference signal (NZP CSI-RS) resources are configured in the resource setting; and NZP CSI-RS resource indicated by each reported CRI is selected from the resource setting. Furthermore, the interference measurement used for the SINR calculation of each reported CRI is based on NZP CSI-RS resources indicated by the other reported CRIs. Furthermore, the terminal is configured to use the quasi co-location (QCL)-type D configured to NZP CSI-RS resource indicated by each reported CRI to measure NZP CSI-RS resources indicated by the other reported CRIs for interference measurement. Furthermore, the interference measurement used for the SINR calculation of each reported CRI is further based on other interference signal on REs of NZP CSI-RS resource indicated by itself. Furthermore, Step S204 may comprise: the terminal calculates the SINR of first reported CRI by measuring interference from NZP CSI-RS resource indicated by second reported CRI and interference from other interference signal on REs of NZP CSI-RS resource indicated by the first reported CRI and calculates the SINR of the second reported CRI by measuring interference from the NZP CSI-RS resource indicated by the first reported CRI and interference from other interference signal on REs of the NZP CSI-RS resource indicated by the second reported CRI.

In an embodiment of the present disclosure, there are two resource settings configured for the group-based SINR report; first resource setting configured with at least two NZP CSI-RS resources or SS/PBCH blocks is used for channel measurement and second resource setting configured with at least two CSI-IM resources is used for interference measurement; each NZP CSI-RS resource or SS/PBCH block in the first resource setting is associated with one CSI-IM resource in the second resource setting; and NZP CSI-RS resource or SS/PBCH block indicated by each reported CRI or SSBRI is selected from the first resource setting. Furthermore, the interference measurement used for the SINR calculation of each reported CRI or SSBRI is based on NZP CSI-RS resources or SS/PBCH blocks indicated by the other reported CRIs or SSBRIs. Furthermore, the terminal is configured to use the QCL-type D configured to NZP CSI-RS resource indicated by each reported CRI to measure NZP CSI-RS resources indicated by the other reported CRIs for interference measurement. Furthermore, the interference measurement used for the SINR calculation of each reported CRI is further based on other interference signal on REs of NZP CSI-RS resource indicated by itself. Furthermore, the interference measurement used for the SINR calculation of each reported CRI is further based on CSI-IM resource in the second resource settings associated with NZP CSI-RS resource indicated by itself. Furthermore, Step S204 may comprise: the terminal calculates the SINR of first reported CRI by measuring interference from NZP CSI-RS resource indicated by second reported CRI, interference from other interference signal on REs of NZP CSI-RS resource indicated by the first reported CRI and interference from CSI-IM resource associated with the NZP CSI-RS resource indicated by the first reported CRI and the SINR of the second reported CRI by measuring interference from the NZP CSI-RS resource indicated by the first reported CRI, interference from other interference signal on REs of the NZP CSI-RS resource indicated by the second reported CRI and interference from CSI-IM resource associated with the NZP CSI-RS resource indicated by the second reported CRI.

In an embodiment of the present disclosure, there are two resource settings configured for the group-based SINR report; first resource setting configured with at least two NZP CSI-RS resources or SS/PBCH blocks is used for channel measurement and second resource setting configured with at least two NZP CSI-RS resources is used for interference measurement; each NZP CSI-RS resource or SS/PBCH block in the first resource setting is associated with one NZP CSI-RS resource in the second resource setting; and NZP CSI-RS resource or SS/PBCH block indicated by each reported CRI or SSBRI is selected from the first resource setting. Furthermore, the interference measurement used for the SINR calculation of each reported CRI or SSBRI is based on NZP CSI-RS resources or SS/PBCH blocks indicated by the other reported CRIs or SSBRIs. Furthermore, the terminal is configured to use the QCL-type D configured to NZP CSI-RS resource indicated by each reported CRI to measure NZP CSI-RS resources indicated by the other reported CRIs for interference measurement. Furthermore, the interference measurement used for the SINR calculation of each reported CRI is further based on other interference signal on REs of NZP CSI-RS resource indicated by itself. Furthermore, the interference measurement used for the SINR calculation of each reported CRI is further based on NZP CSI-RS resources in the second resource settings associated with NZP CSI-RS resources indicated by itself and by the other reported CRIs. Furthermore, Step S204 may comprise: the terminal calculates the SINR of first reported CRI by measuring interference from NZP CSI-RS resource indicated by second reported CRI, interference from other interference signal on REs of NZP CSI-RS resource indicated by the first reported CRI, interference from NZP CSI-RS resource in the second resource setting associated with the NZP CSI-RS resource indicated by the first reported CRI and interference from NZP CSI-RS resource in the second resource setting associated with the NZP CSI-RS resource indicated by the second reported CRI and the SINR of the second reported CRI by measuring interference from the NZP CSI-RS resource indicated by the first reported CRI, interference from other interference signal on REs of the NZP CSI-RS resource indicated by the second reported CRI, interference from NZP CSI-RS resource in the second resource setting associated with the NZP CSI-RS resource indicated by the first reported CRI and interference from NZP CSI-RS resource in the second resource setting associated with the NZP CSI-RS resource indicated by the second reported CRI.

In an embodiment of the present disclosure, there are three resource settings configured for the group-based SINR report; first resource setting configured with at least two NZP CSI-RS resources or SS/PBCH blocks is used for channel measurement, second resource setting configured with at least two NZP CSI-RS resources is used for interference measurement and third resource setting configured with one CSI-IM resource is used for interference measurement; each NZP CSI-RS resource or SS/PBCH block in the first resource setting is associated with one NZP CSI-RS resource in the second resource setting; and NZP CSI-RS resource or SS/PBCH block indicated by each reported CRI or SSBRI is selected from the first resource setting. Furthermore, the interference measurement used for the SINR calculation of each reported CRI or SSBRI is based on NZP CSI-RS resources or SS/PBCH blocks indicated by the other reported CRIs or SSBRIs. Furthermore, the terminal is configured to use the QCL-type D configured to NZP CSI-RS resource indicated by each reported CRI to measure NZP CSI-RS resources indicated by the other reported CRIs for interference measurement. Furthermore, the interference measurement used for the SINR calculation of each reported CRI is further based on other interference signal on REs of NZP CSI-RS resource indicated by itself. Furthermore, the interference measurement used for the SINR calculation of each reported CRI is further based on NZP CSI-RS resources in the second resource settings associated with NZP CSI-RS resources indicated by itself and by the other reported CRIs. Furthermore, the interference measurement used for the SINR calculation of each reported CRI is further based on the CSI-IM resource. Furthermore, the terminal is configured to use the QCL-Type D configured to NZP CSI-RS resource indicated by each reported CRI to measure the CSI-IM resource. Furthermore, Step S204 may comprise: the terminal calculates the SINR of first reported CRI by measuring interference from NZP CSI-RS resource indicated by second reported CRI, interference from other interference signal on REs of NZP CSI-RS resource indicated by the first reported CRI, interference from NZP CSI-RS resource in the second resource setting associated with the NZP CSI-RS resource indicated by the first reported CRI, interference from NZP CSI-RS resource in the second resource setting associated with the NZP CSI-RS resource indicated by the second reported CRI and interference measured from the CSI-IM resource and the SINR of the second reported CRI by measuring interference from the NZP CSI-RS resource indicated by the first reported CRI, interference from other interference signal on REs of the NZP CSI-RS resource indicated by the second reported CRI, interference from NZP CSI-RS resource in the second resource setting associated with the NZP CSI-RS resource indicated by the first reported CRI, interference from NZP CSI-RS resource in the second resource setting associated with the NZP CSI-RS resource indicated by the second reported CRI and interference measured from the CSI-IM resource.

In an embodiment of the present disclosure, there are two resource settings configured for the group-based SINR report; first resource setting configured with at least two NZP CSI-RS resources is used for channel measurement, second resource setting configured with at least two NZP CSI-RS resources is used for channel measurement; NZP CSI-RS resources indicated by some reported CRIs are selected from the first resource setting and NZP CSI-RS resources indicated by the other reported CRIs are selected from the second resource setting. Furthermore, the interference measurement used for the SINR calculation of each reported CRI is based on NZP CSI-RS resources indicated by the other reported CRIs. Furthermore, the terminal is configured to use the QCL-type D configured to NZP CSI-RS resource indicated by each reported CRI to measure NZP CSI-RS resources indicated by the other reported CRIs for interference measurement. Furthermore, the interference measurement used for the SINR calculation of each reported CRI is further based on other interference signal on REs of NZP CSI-RS resource indicated by itself. Furthermore, Step S204 may comprise: the terminal calculates the SINR of first reported CRI by measuring interference from NZP CSI-RS resource indicated by second reported CRI and interference from other interference signal on REs of NZP CSI-RS resource indicated by the first reported CRI and the SINR of the second reported CRI by measuring interference from the NZP CSI-RS resource indicated by the first reported CRI and interference from other interference signal on REs of the NZP CSI-RS resource indicated by the second reported CRI; wherein the NZP CSI-RS resource indicated by the first reported CRI is selected from the first resource setting and the NZP CSI-RS resources indicated by the second reported CRI is selected from the second resource setting.

In an embodiment of the present disclosure, there are three resource settings configured for the group-based SINR report; first resource setting configured with at least two NZP CSI-RS resources or SS/PBCH blocks is used for channel measurement, second resource setting configured with at least two NZP CSI-RS resources or SS/PBCH blocks is used for channel measurement and third resource setting configured with at least two CSI-IM resources is used for interference measurement; each NZP CSI-RS resource or SS/PBCH block in the first resource setting is associated with one CSI-IM resource in the third resource setting; each NZP CSI-RS resource or SS/PBCH block in the second resource setting is associated with one CSI-IM resource in the third resource setting; NZP CSI-RS resources or SS/PBCH blocks indicated by some reported CRIs or SSBRIs are selected from the first resource setting; and NZP CSI-RS resources or SS/PBCH blocks indicated by the other reported CRIs or SSBRIs are selected from the second resource setting. Furthermore, the interference measurement used for the SINR calculation of each reported CRI or SSBRI is based on NZP CSI-RS resources or SS/PBCH blocks indicated by the other reported CRIs or SSBRIs. Furthermore, the terminal is configured to use the QCL-type D configured to NZP CSI-RS resource indicated by each reported CRI to measure NZP CSI-RS resources indicated by the other reported CRIs for interference measurement. Furthermore, the interference measurement used for the SINR calculation of each reported CRI is further based on other interference signal on REs of NZP CSI-RS resource indicated by itself. Furthermore, the interference measurement used for the SINR calculation of each reported CRI is further based on CSI-IM resource in the third resource settings associated with NZP CSI-RS resource indicated by itself. Furthermore, Step S204 may comprise: the terminal calculates the SINR of first reported CRI by measuring interference from NZP CSI-RS resource indicated by second reported CRI, interference from other interference signal on REs of NZP CSI-RS resource indicated by the first reported CRI and interference from CSI-IM resource associated with the NZP CSI-RS resource indicated by the first reported CRI and the SINR of the second reported CRI by measuring interference from the NZP CSI-RS resource indicated by the first reported CRI, interference from other interference signal on REs of the NZP CSI-RS resource indicated by the second reported CRI and interference from CSI-IM resource associated with the NZP CSI-RS resource indicated by the second reported CRI; wherein the NZP CSI-RS resource indicated by the first reported CRI is selected from the first resource setting and the NZP CSI-RS resources indicated by the second reported CRI is selected from the second resource setting.

In an embodiment of the present disclosure, there are four resource settings configured for the group-based SINR report; first resource setting configured with at least two NZP CSI-RS resources or SS/PBCH blocks is used for channel measurement; second resource setting configured with at least two NZP CSI-RS resources or SS/PBCH blocks is used for channel measurement; third resource setting configured with at least two NZP CSI-RS resources or CSI-IM resources is used for interference measurement; fourth resource setting configured with at least two NZP CSI-RS resources or CSI-IM resources is used for interference measurement; each NZP CSI-RS resource or SS/PBCH block in the first resource setting is associated with one NZP CSI-RS resource or CSI-IM resource in the third resource setting; NZP CSI-RS resource or SS/PBCH block in the second resource setting is associated with one NZP CSI-RS resource or CSI-IM resource in the fourth resource setting; NZP CSI-RS resources or SS/PBCH blocks indicated by some reported CRIs or SSBRIs are selected from the first resource setting; and NZP CSI-RS resources or SS/PBCH blocks indicated by the other reported CRIs or SSBRIs are selected from the second resource setting. Furthermore, the interference measurement used for the SINR calculation of each reported CRI or SSBRI is based on NZP CSI-RS resources or SS/PBCH blocks indicated by the other reported CRIs or SSBRIs. Furthermore, the terminal is configured to use the QCL-type D configured to NZP CSI-RS resource indicated by each reported CRI to measure NZP CSI-RS resources indicated by the other reported CRIs for interference measurement. Furthermore, the interference measurement used for the SINR calculation of each reported CRI is further based on other interference signal on REs of NZP CSI-RS resource indicated by itself. Furthermore, the interference measurement used for the SINR calculation of each reported CRI is further based on NZP CSI-RS resources or CSI-IM resources for interference measurement associated with NZP CSI-RS resources indicated by itself and by the other reported CRIs. Furthermore, Step S204 may comprise: the terminal calculates the SINR of first reported CRI by measuring interference from NZP CSI-RS resource indicated by second reported CRI, interference from other interference signal on REs of NZP CSI-RS resource indicated by the first reported CRI, interference from NZP CSI-RS resource or CSI-IM resource in the third resource setting associated with the NZP CSI-RS resource indicated by the first reported CRI and interference from NZP CSI-RS resource or CSI-IM resource in the fourth resource setting associated with the NZP CSI-RS resource indicated by the second reported CRI and the SINR of the second reported CRI by measuring interference from the NZP CSI-RS resource indicated by the first reported CRI, interference from other interference signal on REs of the NZP CSI-RS resource indicated by the second reported CRI, interference from NZP CSI-RS resource or CSI-IM in the third resource setting associated with the NZP CSI-RS resource indicated by the first reported CRI and interference from NZP CSI-RS resource or CSI-IM in the fourth resource setting associated with the NZP CSI-RS resource indicated by the second reported CRI; wherein the NZP CSI-RS resource indicated by the first reported CRI is selected from the first resource setting and the NZP CSI-RS resources indicated by the second reported CRI is selected from the second resource setting.

In an embodiment of the present disclosure, there are five resource settings configured for the group-based SINR report; first resource setting configured with at least two NZP CSI-RS resources or SS/PBCH blocks is used for channel measurement; second resource setting configured with at least two NZP CSI-RS resources or SS/PBCH blocks is used for channel measurement; third resource setting configured with at least two NZP CSI-RS resources or CSI-IM resources is used for interference measurement; fourth resource setting configured with at least two NZP CSI-RS resources or CSI-IM resources is used for interference measurement; fifth resource setting configured with one CSI-IM resource is used for interference measurement; each NZP CSI-RS resource or SS/PBCH block in the first resource setting is associated with one NZP CSI-RS resource or CSI-IM resource in the third resource setting; NZP CSI-RS resource or SS/PBCH block in the second resource setting is associated with one NZP CSI-RS resource or CSI-IM resource in the fourth resource setting; NZP CSI-RS resources or SS/PBCH blocks indicated by some reported CRIs or SSBRIs are selected from the first resource setting; and NZP CSI-RS resources or SS/PBCH blocks indicated by the other reported CRIs or SSBRIs are selected from the second resource setting. Furthermore, the interference measurement used for the SINR calculation of each reported CRI or SSBRI is based on NZP CSI-RS resources or SS/PBCH blocks indicated by the other reported CRIs or SSBRIs. Furthermore, the terminal is configured to use the QCL-type D configured to NZP CSI-RS resource indicated by each reported CRI to measure NZP CSI-RS resources indicated by the other reported CRIs for interference measurement. Furthermore, the interference measurement used for the SINR calculation of each reported CRI is further based on other interference signal on REs of NZP CSI-RS resource indicated by itself. Furthermore, the interference measurement used for the SINR calculation of each reported CRI is further based on NZP CSI-RS resources or CSI-IM resources for interference measurement associated with NZP CSI-RS resources indicated by itself and by the other reported CRIs. Furthermore, the interference measurement used for the SINR calculation of each reported CRI is further based on the CSI-IM resource in the fifth resource setting. Furthermore, the terminal is configured to use the QCL-Type D configured to NZP CSI-RS resource indicated by each reported CRI to measure the CSI-IM resource in the fifth resource setting. Furthermore, Step S204 may comprise: the terminal calculates the SINR of first reported CRI by measuring interference from NZP CSI-RS resource indicated by second reported CRI, interference from other interference signal on REs of NZP CSI-RS resource indicated by the first reported CRI, interference from NZP CSI-RS resource or CSI-IM resource in the third resource setting associated with the NZP CSI-RS resource indicated by the first reported CRI; interference from NZP CSI-RS resource or CSI-IM resource in the fourth resource setting associated with the NZP CSI-RS resource indicated by the second reported CRI; and interference measured from the CSI-IM resource in the fifth resource setting and the SINR of the second reported CRI by measuring interference from the NZP CSI-RS resource indicated by the first reported CRI, interference from other interference signal on REs of the NZP CSI-RS resource indicated by the second reported CRI, interference from NZP CSI-RS resource or CSI-IM in the third resource setting associated with the NZP CSI-RS resource indicated by the first reported CRI; interference from NZP CSI-RS resource or CSI-IM in the fourth resource setting associated with the NZP CSI-RS resource indicated by the second reported CRI; and interference measured from the CSI-IM resource in the fifth resource setting; wherein the NZP CSI-RS resource indicated by the first reported CRI is selected from the first resource setting and the NZP CSI-RS resources indicated by the second reported CRI is selected from the second resource setting.

In Step S206, the terminal reports the CRIs or SSBRIs and their SINRs to the network device.

According to the communication method of the embodiment of the disclosure, new definitions of L1-SINR calculation for group-based L1-SINR report are specified which can avoid that the transmission using the Tx beam of a first CRI/SSBRI would cause interference to and also experience interference from the transmission using the Tx beam of a second CRI/SSBRI.

Furthermore, according to the communication method of the embodiment of the disclosure, new resource configurations are provided to support the implementation of configuring the UE to select Tx beams from different TRP, by configuring two resource settings for channel measurement.

The following is embodiments of the device of the present disclosure, which can be used to carry out the method embodiments of the present disclosure. For details not disclosed in the embodiment of the device of the present disclosure, please refer to the method embodiments of the present disclosure.

Figure 3:
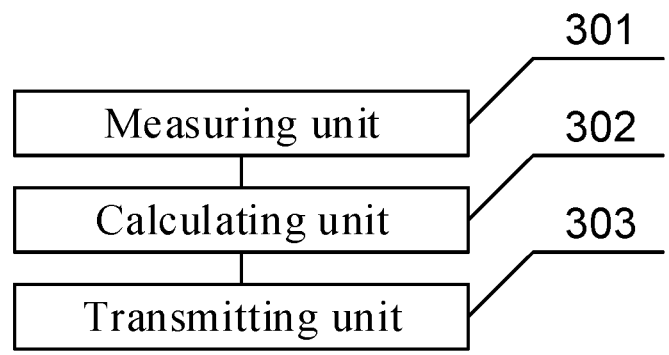
FIG. 3 schematically illustrates a terminal according to an embodiment of the present disclosure.

FIG. 3 schematically illustrates a terminal according to an embodiment of the present disclosure. The terminal may be a UE in NR system.

Referring to FIG. 3, the terminal 30 comprises: a measuring unit 301, a calculating unit 302 and a transmitting unit 303.

The measuring unit 301 is configured to measure at least two CSI-RS resources or SS/PBCH blocks selected from one or more resource settings configured for group-based SINR report.

The calculating unit 302 is configured to calculate SINRs of CRIs or SSBRIs corresponding to the selected CSI-RS resources or SS/PBCH blocks according to the measurement results of the selected CSI-RS resources or SS/PBCH blocks.

Wherein the interference measurement used for the SINR calculation of each reported CRI or SSBIR is based on the other reported CRIs or SSBIRs.

The transmitting unit 303 is configured to report the CRIs or SSBRIs and their SINRs to network device.

In an embodiment of the present disclosure, there is one resource setting configured for the group-based SINR report and at least two non-zero-power channel state information reference signal (NZP CSI-RS) resources are configured in the resource setting; and NZP CSI-RS resource indicated by each reported CRI is selected from the resource setting. Furthermore, the interference measurement used for the SINR calculation of each reported CRI is based on NZP CSI-RS resources indicated by the other reported CRIs. Furthermore, the terminal is configured to use the quasi co-location (QCL)-type D configured to NZP CSI-RS resource indicated by each reported CRI to measure NZP CSI-RS resources indicated by the other reported CRIs for interference measurement. Furthermore, the interference measurement used for the SINR calculation of each reported CRI is further based on other interference signal on REs of NZP CSI-RS resource indicated by itself. Furthermore, the calculating unit 302 is further configured to calculate the SINR of first reported CRI by measuring interference from NZP CSI-RS resource indicated by second reported CRI and interference from other interference signal on REs of NZP CSI-RS resource indicated by the first reported CRI and calculates the SINR of the second reported CRI by measuring interference from the NZP CSI-RS resource indicated by the first reported CRI and interference from other interference signal on REs of the NZP CSI-RS resource indicated by the second reported CRI.

In an embodiment of the present disclosure, there are two resource settings configured for the group-based SINR report; first resource setting configured with at least two NZP CSI-RS resources or SS/PBCH blocks is used for channel measurement and second resource setting configured with at least two CSI-IM resources is used for interference measurement; each NZP CSI-RS resource or SS/PBCH block in the first resource setting is associated with one CSI-IM resource in the second resource setting; and NZP CSI-RS resource or SS/PBCH block indicated by each reported CRI or SSBRI is selected from the first resource setting. Furthermore, the interference measurement used for the SINR calculation of each reported CRI or SSBRI is based on NZP CSI-RS resources or SS/PBCH blocks indicated by the other reported CRIs or SSBRIs. Furthermore, the terminal is configured to use the QCL-type D configured to NZP CSI-RS resource indicated by each reported CRI to measure NZP CSI-RS resources indicated by the other reported CRIs for interference measurement. Furthermore, the interference measurement used for the SINR calculation of each reported CRI is further based on other interference signal on REs of NZP CSI-RS resource indicated by itself. Furthermore, the interference measurement used for the SINR calculation of each reported CRI is further based on CSI-IM resource in the second resource settings associated with NZP CSI-RS resource indicated by itself. Furthermore, the calculating unit 302 is further configured to calculate the SINR of first reported CRI by measuring interference from NZP CSI-RS resource indicated by second reported CRI, interference from other interference signal on REs of NZP CSI-RS resource indicated by the first reported CRI and interference from CSI-IM resource associated with the NZP CSI-RS resource indicated by the first reported CRI and the SINR of the second reported CRI by measuring interference from the NZP CSI-RS resource indicated by the first reported CRI, interference from other interference signal on REs of the NZP CSI-RS resource indicated by the second reported CRI and interference from CSI-IM resource associated with the NZP CSI-RS resource indicated by the second reported CRI.

In an embodiment of the present disclosure, there are two resource settings configured for the group-based SINR report; first resource setting configured with at least two NZP CSI-RS resources or SS/PBCH blocks is used for channel measurement and second resource setting configured with at least two NZP CSI-RS resources is used for interference measurement; each NZP CSI-RS resource or SS/PBCH block in the first resource setting is associated with one NZP CSI-RS resource in the second resource setting; and NZP CSI-RS resource or SS/PBCH block indicated by each reported CRI or SSBRI is selected from the first resource setting. Furthermore, the interference measurement used for the SINR calculation of each reported CRI or SSBRI is based on NZP CSI-RS resources or SS/PBCH blocks indicated by the other reported CRIs or SSBRIs. Furthermore, the terminal is configured to use the QCL-type D configured to NZP CSI-RS resource indicated by each reported CRI to measure NZP CSI-RS resources indicated by the other reported CRIs for interference measurement. Furthermore, the interference measurement used for the SINR calculation of each reported CRI is further based on other interference signal on REs of NZP CSI-RS resource indicated by itself. Furthermore, the interference measurement used for the SINR calculation of each reported CRI is further based on NZP CSI-RS resources in the second resource settings associated with NZP CSI-RS resources indicated by itself and by the other reported CRIs. Furthermore, the calculating unit 302 is further configured to calculate the SINR of first reported CRI by measuring interference from NZP CSI-RS resource indicated by second reported CRI, interference from other interference signal on REs of NZP CSI-RS resource indicated by the first reported CRI, interference from NZP CSI-RS resource in the second resource setting associated with the NZP CSI-RS resource indicated by the first reported CRI and interference from NZP CSI-RS resource in the second resource setting associated with the NZP CSI-RS resource indicated by the second reported CRI and the SINR of the second reported CRI by measuring interference from the NZP CSI-RS resource indicated by the first reported CRI, interference from other interference signal on REs of the NZP CSI-RS resource indicated by the second reported CRI, interference from NZP CSI-RS resource in the second resource setting associated with the NZP CSI-RS resource indicated by the first reported CRI and interference from NZP CSI-RS resource in the second resource setting associated with the NZP CSI-RS resource indicated by the second reported CRI.

In an embodiment of the present disclosure, there are three resource settings configured for the group-based SINR report; first resource setting configured with at least two NZP CSI-RS resources or SS/PBCH blocks is used for channel measurement, second resource setting configured with at least two NZP CSI-RS resources is used for interference measurement and third resource setting configured with one CSI-IM resource is used for interference measurement; each NZP CSI-RS resource or SS/PBCH block in the first resource setting is associated with one NZP CSI-RS resource in the second resource setting; and NZP CSI-RS resource or SS/PBCH block indicated by each reported CRI or SSBRI is selected from the first resource setting. Furthermore, the interference measurement used for the SINR calculation of each reported CRI or SSBRI is based on NZP CSI-RS resources or SS/PBCH blocks indicated by the other reported CRIs or SSBRIs. Furthermore, the terminal is configured to use the QCL-type D configured to NZP CSI-RS resource indicated by each reported CRI to measure NZP CSI-RS resources indicated by the other reported CRIs for interference measurement. Furthermore, the interference measurement used for the SINR calculation of each reported CRI is further based on other interference signal on REs of NZP CSI-RS resource indicated by itself. Furthermore, the interference measurement used for the SINR calculation of each reported CRI is further based on NZP CSI-RS resources in the second resource settings associated with NZP CSI-RS resources indicated by itself and by the other reported CRIs. Furthermore, the interference measurement used for the SINR calculation of each reported CRI is further based on the CSI-IM resource. Furthermore, the terminal is configured to use the QCL-Type D configured to NZP CSI-RS resource indicated by each reported CRI to measure the CSI-IM resource. Furthermore, the calculating unit 302 is further configured to calculate the SINR of first reported CRI by measuring interference from NZP CSI-RS resource indicated by second reported CRI, interference from other interference signal on REs of NZP CSI-RS resource indicated by the first reported CRI, interference from NZP CSI-RS resource in the second resource setting associated with the NZP CSI-RS resource indicated by the first reported CRI, interference from NZP CSI-RS resource in the second resource setting associated with the NZP CSI-RS resource indicated by the second reported CRI and interference measured from the CSI-IM resource and the SINR of the second reported CRI by measuring interference from the NZP CSI-RS resource indicated by the first reported CRI, interference from other interference signal on REs of the NZP CSI-RS resource indicated by the second reported CRI, interference from NZP CSI-RS resource in the second resource setting associated with the NZP CSI-RS resource indicated by the first reported CRI, interference from NZP CSI-RS resource in the second resource setting associated with the NZP CSI-RS resource indicated by the second reported CRI and interference measured from the CSI-IM resource.

In an embodiment of the present disclosure, there are two resource settings configured for the group-based SINR report; first resource setting configured with at least two NZP CSI-RS resources is used for channel measurement, second resource setting configured with at least two NZP CSI-RS resources is used for channel measurement; NZP CSI-RS resources indicated by some reported CRIs are selected from the first resource setting and NZP CSI-RS resources indicated by the other reported CRIs are selected from the second resource setting. Furthermore, the interference measurement used for the SINR calculation of each reported CRI is based on NZP CSI-RS resources indicated by the other reported CRIs. Furthermore, the terminal is configured to use the QCL-type D configured to NZP CSI-RS resource indicated by each reported CRI to measure NZP CSI-RS resources indicated by the other reported CRIs for interference measurement. Furthermore, the interference measurement used for the SINR calculation of each reported CRI is further based on other interference signal on REs of NZP CSI-RS resource indicated by itself. Furthermore, the calculating unit 302 is further configured to calculate the SINR of first reported CRI by measuring interference from NZP CSI-RS resource indicated by second reported CRI and interference from other interference signal on REs of NZP CSI-RS resource indicated by the first reported CRI and the SINR of the second reported CRI by measuring interference from the NZP CSI-RS resource indicated by the first reported CRI and interference from other interference signal on REs of the NZP CSI-RS resource indicated by the second reported CRI; wherein the NZP CSI-RS resource indicated by the first reported CRI is selected from the first resource setting and the NZP CSI-RS resources indicated by the second reported CRI is selected from the second resource setting.

In an embodiment of the present disclosure, there are three resource settings configured for the group-based SINR report; first resource setting configured with at least two NZP CSI-RS resources or SS/PBCH blocks is used for channel measurement, second resource setting configured with at least two NZP CSI-RS resources or SS/PBCH blocks is used for channel measurement and third resource setting configured with at least two CSI-IM resources is used for interference measurement; each NZP CSI-RS resource or SS/PBCH block in the first resource setting is associated with one CSI-IM resource in the third resource setting; each NZP CSI-RS resource or SS/PBCH block in the second resource setting is associated with one CSI-IM resource in the third resource setting; NZP CSI-RS resources or SS/PBCH blocks indicated by some reported CRIs or SSBRIs are selected from the first resource setting; and NZP CSI-RS resources or SS/PBCH blocks indicated by the other reported CRIs or SSBRIs are selected from the second resource setting. Furthermore, the interference measurement used for the SINR calculation of each reported CRI or SSBRI is based on NZP CSI-RS resources or SS/PBCH blocks indicated by the other reported CRIs or SSBRIs. Furthermore, the terminal is configured to use the QCL-type D configured to NZP CSI-RS resource indicated by each reported CRI to measure NZP CSI-RS resources indicated by the other reported CRIs for interference measurement. Furthermore, the interference measurement used for the SINR calculation of each reported CRI is further based on other interference signal on REs of NZP CSI-RS resource indicated by itself. Furthermore, the interference measurement used for the SINR calculation of each reported CRI is further based on CSI-IM resource in the third resource settings associated with NZP CSI-RS resource indicated by itself. Furthermore, the calculating unit 302 is further configured to calculate the SINR of first reported CRI by measuring interference from NZP CSI-RS resource indicated by second reported CRI, interference from other interference signal on REs of NZP CSI-RS resource indicated by the first reported CRI and interference from CSI-IM resource associated with the NZP CSI-RS resource indicated by the first reported CRI and the SINR of the second reported CRI by measuring interference from the NZP CSI-RS resource indicated by the first reported CRI, interference from other interference signal on REs of the NZP CSI-RS resource indicated by the second reported CRI and interference from CSI-IM resource associated with the NZP CSI-RS resource indicated by the second reported CRI; wherein the NZP CSI-RS resource indicated by the first reported CRI is selected from the first resource setting and the NZP CSI-RS resources indicated by the second reported CRI is selected from the second resource setting.

In an embodiment of the present disclosure, there are four resource settings configured for the group-based SINR report; first resource setting configured with at least two NZP CSI-RS resources or SS/PBCH blocks is used for channel measurement; second resource setting configured with at least two NZP CSI-RS resources or SS/PBCH blocks is used for channel measurement; third resource setting configured with at least two NZP CSI-RS resources or CSI-IM resources is used for interference measurement; fourth resource setting configured with at least two NZP CSI-RS resources or CSI-IM resources is used for interference measurement; each NZP CSI-RS resource or SS/PBCH block in the first resource setting is associated with one NZP CSI-RS resource or CSI-IM resource in the third resource setting; NZP CSI-RS resource or SS/PBCH block in the second resource setting is associated with one NZP CSI-RS resource or CSI-IM resource in the fourth resource setting; NZP CSI-RS resources or SS/PBCH blocks indicated by some reported CRIs or SSBRIs are selected from the first resource setting; and NZP CSI-RS resources or SS/PBCH blocks indicated by the other reported CRIs or SSBRIs are selected from the second resource setting. Furthermore, the interference measurement used for the SINR calculation of each reported CRI or SSBRI is based on NZP CSI-RS resources or SS/PBCH blocks indicated by the other reported CRIs or SSBRIs. Furthermore, the terminal is configured to use the QCL-type D configured to NZP CSI-RS resource indicated by each reported CRI to measure NZP CSI-RS resources indicated by the other reported CRIs for interference measurement. Furthermore, the interference measurement used for the SINR calculation of each reported CRI is further based on other interference signal on REs of NZP CSI-RS resource indicated by itself. Furthermore, the interference measurement used for the SINR calculation of each reported CRI is further based on NZP CSI-RS resources or CSI-IM resources for interference measurement associated with NZP CSI-RS resources indicated by itself and by the other reported CRIs. Furthermore, the calculating unit 302 is further configured to calculate the SINR of first reported CRI by measuring interference from NZP CSI-RS resource indicated by second reported CRI, interference from other interference signal on REs of NZP CSI-RS resource indicated by the first reported CRI, interference from NZP CSI-RS resource or CSI-IM resource in the third resource setting associated with the NZP CSI-RS resource indicated by the first reported CRI and interference from NZP CSI-RS resource or CSI-IM resource in the fourth resource setting associated with the NZP CSI-RS resource indicated by the second reported CRI and the SINR of the second reported CRI by measuring interference from the NZP CSI-RS resource indicated by the first reported CRI, interference from other interference signal on REs of the NZP CSI-RS resource indicated by the second reported CRI, interference from NZP CSI-RS resource or CSI-IM in the third resource setting associated with the NZP CSI-RS resource indicated by the first reported CRI and interference from NZP CSI-RS resource or CSI-IM in the fourth resource setting associated with the NZP CSI-RS resource indicated by the second reported CRI; wherein the NZP CSI-RS resource indicated by the first reported CRI is selected from the first resource setting and the NZP CSI-RS resources indicated by the second reported CRI is selected from the second resource setting.

In an embodiment of the present disclosure, there are five resource settings configured for the group-based SINR report; first resource setting configured with at least two NZP CSI-RS resources or SS/PBCH blocks is used for channel measurement; second resource setting configured with at least two NZP CSI-RS resources or SS/PBCH blocks is used for channel measurement; third resource setting configured with at least two NZP CSI-RS resources or CSI-IM resources is used for interference measurement; fourth resource setting configured with at least two NZP CSI-RS resources or CSI-IM resources is used for interference measurement; fifth resource setting configured with one CSI-IM resource is used for interference measurement; each NZP CSI-RS resource or SS/PBCH block in the first resource setting is associated with one NZP CSI-RS resource or CSI-IM resource in the third resource setting; NZP CSI-RS resource or SS/PBCH block in the second resource setting is associated with one NZP CSI-RS resource or CSI-IM resource in the fourth resource setting; NZP CSI-RS resources or SS/PBCH blocks indicated by some reported CRIs or SSBRIs are selected from the first resource setting; and NZP CSI-RS resources or SS/PBCH blocks indicated by the other reported CRIs or SSBRIs are selected from the second resource setting. Furthermore, the interference measurement used for the SINR calculation of each reported CRI or SSBRI is based on NZP CSI-RS resources or SS/PBCH blocks indicated by the other reported CRIs or SSBRIs. Furthermore, the terminal is configured to use the QCL-type D configured to NZP CSI-RS resource indicated by each reported CRI to measure NZP CSI-RS resources indicated by the other reported CRIs for interference measurement. Furthermore, the interference measurement used for the SINR calculation of each reported CRI is further based on other interference signal on REs of NZP CSI-RS resource indicated by itself. Furthermore, the interference measurement used for the SINR calculation of each reported CRI is further based on NZP CSI-RS resources or CSI-IM resources for interference measurement associated with NZP CSI-RS resources indicated by itself and by the other reported CRIs. Furthermore, the interference measurement used for the SINR calculation of each reported CRI is further based on the CSI-IM resource in the fifth resource setting. Furthermore, the terminal is configured to use the QCL-Type D configured to NZP CSI-RS resource indicated by each reported CRI to measure the CSI-IM resource in the fifth resource setting. Furthermore, the calculating unit 302 is further configured to calculate the SINR of first reported CRI by measuring interference from NZP CSI-RS resource indicated by second reported CRI, interference from other interference signal on REs of NZP CSI-RS resource indicated by the first reported CRI, interference from NZP CSI-RS resource or CSI-IM resource in the third resource setting associated with the NZP CSI-RS resource indicated by the first reported CRI; interference from NZP CSI-RS resource or CSI-IM resource in the fourth resource setting associated with the NZP CSI-RS resource indicated by the second reported CRI; and interference measured from the CSI-IM resource in the fifth resource setting and the SINR of the second reported CRI by measuring interference from the NZP CSI-RS resource indicated by the first reported CRI, interference from other interference signal on REs of the NZP CSI-RS resource indicated by the second reported CRI, interference from NZP CSI-RS resource or CSI-IM in the third resource setting associated with the NZP CSI-RS resource indicated by the first reported CRI; interference from NZP CSI-RS resource or CSI-IM in the fourth resource setting associated with the NZP CSI-RS resource indicated by the second reported CRI; and interference measured from the CSI-IM resource in the fifth resource setting; wherein the NZP CSI-RS resource indicated by the first reported CRI is selected from the first resource setting and the NZP CSI-RS resources indicated by the second reported CRI is selected from the second resource setting.

Figure 4:
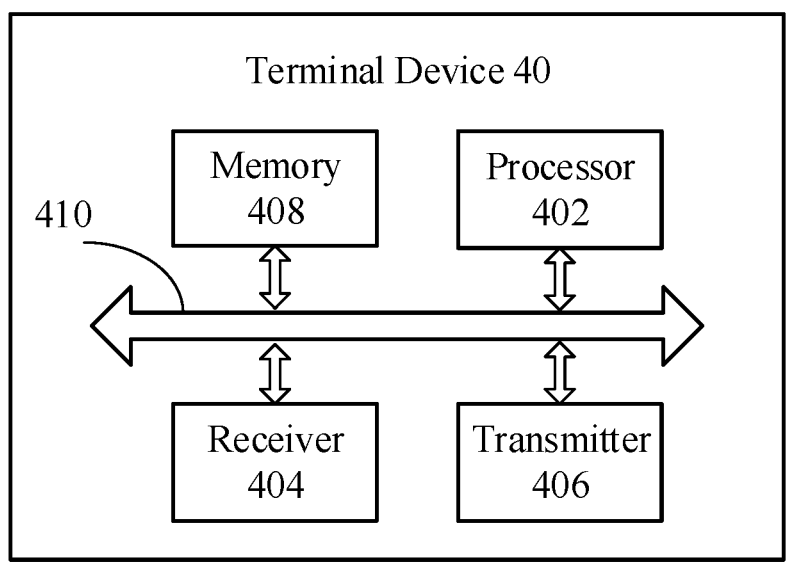
FIG. 4 schematically illustrates a terminal device according to an embodiment of the present disclosure.

It is important to note that, in the embodiment of the disclosure, The measuring unit 301 and the calculating unit 302 may be implemented by a processor (e.g. the processor 402 in FIG. 4), and the transmitting unit 303 may be implemented by a transmitter (e.g. the transmitter 406 in FIG. 4).

FIG. 4 schematically illustrates a terminal device according to an embodiment of the present disclosure.

As illustrated in FIG. 4, a terminal device 40 may include a processor 402, a receiver 404, a transmitter 406 and a memory 408, wherein the memory 408 may be configured to store a code executed by the processor 402 an the like.

Each component in the terminal device 40 is coupled together through a bus system 410, wherein the bus system 410 includes a data bus, and further includes a power bus, a control bus and a state signal bus.

The processor 402 typically controls overall operations of the terminal device 40, such as the operations associated with display, data communications and recording operations. The processor 402 may include one or more processors to execute codes in the memory 408. Optionally, when the codes are executed, the processor 402 implements the method performed by the terminal in the method embodiment, which will not be repeated here for brevity. Moreover, the processor 402 may include one or more modules which facilitate the interaction between the processor 402 and other components.

The memory 408 is configured to store various types of data to support the operation of the terminal device 40. Examples of such data include instructions for any applications or methods operated on the terminal device 40, contact data, phonebook data, messages, pictures, video, etc. The memory 408 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory or a magnetic or optical disk.

The receiver 404 is configured to receive an electromagnetic signal received by the antenna. The main function of the receiver is to select the frequency components it needs from the numerous electromagnetic waves existing in the air, suppress or filter out unwanted signals or noise and interference signals, and then obtain the original useful information after amplification and demodulation.

The transmitter 406 is configured to generate and modulate the RF current and transmit the radio waves through the antenna.

In embodiments of the present disclosure, the transmitter 406 and receiver 404 may be implemented as a transceiver.

The terminal 30 illustrated in FIG. 3 and the terminal device 40 illustrated in FIG. 4 may implement each process implanted by the terminal in the abovementioned method embodiments and will not be elaborated herein to avoid repetitions.

Exemplary embodiments have been specifically shown and described as above. It will be appreciated by those skilled in the art that the disclosure is not limited the disclosed embodiments; rather, all suitable modifications and equivalent which come within the spirit and scope of the appended claims are intended to fall within the scope of the disclosure.

What is claimed is:

1. A communication method, comprising:
   measuring, by a terminal, at least two channel state information reference signal (CSI-RS) resources or synchronization signal/physical broadcast channel (SS/PBCH) blocks selected from one or more resource settings configured for group-based SINR report;
   calculating, by the terminal, signal to interference noise ratios (SINRs) of CSI-RS resource indicators (CRIs) or SS/PBCH block resource indicators (SSBRIs) corresponding to the selected CSI-RS resources or SS/PBCH blocks according to the measurement results of the selected CSI-RS resources or SS/PBCH blocks; and
   reporting, by the terminal, the CRIs or SSBRIs and their SINRs to a network device;
   wherein the reported CRIs or SSBRIs are received simultaneously by the terminal and the interference measurement used for the SINR calculation of each reported CRI or SSBIR is based on the other reported CRIs or SSBIRs; and
   wherein using the quasi co-location (QCL)-type D configured to NZP CSI-RS resource indicated by each reported CRI to measure NZP CSI-RS resources indicated by the other reported CRIs for interference measurement.

2. The method according to claim 1, wherein there is one resource setting configured for the group-based SINR report and at least two non-zero-power channel state information reference signal (NZP CSI-RS) resources are configured in the resource setting; and NZP CSI-RS resource indicated by each reported CRI is selected from the resource setting.

3. The method according to claim 2, wherein the interference measurement used for the SINR calculation of each reported CRI is based on NZP CSI-RS resources indicated by the other reported CRIs.

4. The method according to claim 3, wherein the interference measurement used for the SINR calculation of each reported CRI is further based on other interference signal on REs of NZP CSI-RS resource indicated by itself.

5. The method according to claim 1, wherein there are two resource settings configured for the group-based SINR report; first resource setting configured with at least two NZP CSI-RS resources or SS/PBCH blocks is used for channel measurement and second resource setting configured with at least two CSI-IM resources is used for interference measurement; each NZP CSI-RS resource or SS/PBCH block in the first resource setting is associated with one CSI-IM resource in the second resource setting; and NZP CSI-RS resource or SS/PBCH block indicated by each reported CRI or SSBRI is selected from the first resource setting.

6. The method according to claim 5, wherein the interference measurement used for the SINR calculation of each reported CRI or SSBRI is based on NZP CSI-RS resources or SS/PBCH blocks indicated by the other reported CRIs or SSBRIs.

7. The method according to claim 1, wherein there are two resource settings configured for the group-based SINR report; first resource setting configured with at least two NZP CSI-RS resources or SS/PBCH blocks is used for channel measurement and second resource setting configured with at least two NZP CSI-RS resources is used for interference measurement; each NZP CSI-RS resource or SS/PBCH block in the first resource setting is associated with one NZP CSI-RS resource in the second resource setting; and NZP CSI-RS resource or SS/PBCH block indicated by each reported CRI or SSBRI is selected from the first resource setting.

8. The method according to claim 7, wherein the interference measurement used for the SINR calculation of each reported CRI or SSBRI is based on NZP CSI-RS resources or SS/PBCH blocks indicated by the other reported CRIs or SSBRIs.

9. The method according to claim 1, wherein there are three resource settings configured for the group-based SINR report; first resource setting configured with at least two NZP CSI-RS resources or SS/PBCH blocks is used for channel measurement, second resource setting configured with at least two NZP CSI-RS resources is used for interference measurement and third resource setting configured with one CSI-IM resource is used for interference measurement; each NZP CSI-RS resource or SS/PBCH block in the first resource setting is associated with one NZP CSI-RS resource in the second resource setting;
and NZP CSI-RS resource or SS/PBCH block indicated by each reported CRI or SSBRI is selected from the first resource setting.

10. The method according to claim 9, wherein the interference measurement used for the SINR calculation of each reported CRI or SSBRI is based on NZP CSI-RS resources or SS/PBCH blocks indicated by the other reported CRIs or SSBRIs.

11. The method according to claim 1, wherein there are two resource settings configured for the group-based SINR report; first resource setting configured with at least two NZP CSI-RS resources is used for channel measurement, second resource setting configured with at least two NZP CSI-RS resources is used for channel measurement; NZP CSI-RS resources indicated by some reported CRIs are selected from the first resource setting and NZP CSI-RS resources indicated by the other reported CRIs are selected from the second resource setting.

12. The method according to claim 11, wherein the interference measurement used for the SINR calculation of each reported CRI is based on NZP CSI-RS resources indicated by the other reported CRIs.

13. The method according to claim 1, there are three resource settings configured for the group-based SINR report; first resource setting configured with at least two NZP CSI-RS resources or SS/PBCH blocks is used for channel measurement, second resource setting configured with at least two NZP CSI-RS resources or SS/PBCH blocks is used for channel measurement and third resource setting configured with at least two CSI-IM resources is used for interference measurement; each NZP CSI-RS resource or SS/PBCH block in the first resource setting is associated with one CSI-IM resource in the third resource setting; each NZP CSI-RS resource or SS/PBCH block in the second resource setting is associated with one CSI-IM resource in the third resource setting; NZP CSI-RS resources or SS/PBCH blocks indicated by some reported CRIs or SSBRIs are selected from the first resource setting; and NZP CSI-RS resources or SS/PBCH blocks indicated by the other reported CRIs or SSBRIs are selected from the second resource setting.

14. The method according to claim 13, wherein the interference measurement used for the SINR calculation of each reported CRI or SSBRI is based on NZP CSI-RS resources or SS/PBCH blocks indicated by the other reported CRIs or SSBRIs.

15. The method according to claim 1, wherein there are four resource settings configured for the group-based SINR report; first resource setting configured with at least two NZP CSI-RS resources or SS/PBCH blocks is used for channel measurement; second resource setting configured with at least two NZP CSI-RS resources or SS/PBCH blocks is used for channel measurement; third resource setting configured with at least two NZP CSI-RS resources or CSI-IM resources is used for interference measurement; fourth resource setting configured with at least two NZP CSI-RS resources or CSI-IM resources is used for interference measurement; each NZP CSI-RS resource or SS/PBCH block in the first resource setting is associated with one NZP CSI-RS resource or CSI-IM resource in the third resource setting; NZP CSI-RS resource or SS/PBCH block in the second resource setting is associated with one NZP CSI-RS resource or CSI-IM resource in the fourth resource setting; NZP CSI-RS resources or SS/PBCH blocks indicated by some reported CRIs or SSBRIs are selected from the first resource setting; and NZP CSI-RS resources or SS/PBCH blocks indicated by the other reported CRIs or SSBRIs are selected from the second resource setting.

16. The method according to claim 15, wherein the interference measurement used for the SINR calculation of each reported CRI or SSBRI is based on NZP CSI-RS resources or SS/PBCH blocks indicated by the other reported CRIs or SSBRIs.

17. The method according to claim 1, wherein there are five resource settings configured for the group-based SINR report; first resource setting configured with at least two NZP CSI-RS resources or SS/PBCH blocks is used for channel measurement; second resource setting configured with at least two NZP CSI-RS resources or SS/PBCH blocks is used for channel measurement; third resource setting configured with at least two NZP CSI-RS resources or CSI-IM resources is used for interference measurement; fourth resource setting configured with at least two NZP CSI-RS resources or CSI-IM resources is used for interference measurement; fifth resource setting configured with one CSI-IM resource is used for interference measurement; each NZP CSI-RS resource or SS/PBCH block in the first resource setting is associated with one NZP CSI-RS resource or CSI-IM resource in the third resource setting; NZP CSI-RS resource or SS/PBCH block in the second resource setting is associated with one NZP CSI-RS resource or CSI-IM resource in the fourth resource setting; NZP CSI-RS resources or SS/PBCH blocks indicated by some reported CRIs or SSBRIs are selected from the first resource setting; and NZP CSI-RS resources or SS/PBCH blocks indicated by the other reported CRIs or SSBRIs are selected from the second resource setting.

18. The method according to claim 17, wherein the interference measurement used for the SINR calculation of each reported CRI or SSBRI is based on NZP CSI-RS resources or SS/PBCH blocks indicated by the other reported CRIs or SSBRIs.

19. A terminal device, comprising:
a processor;
a memory configured to store instructions executable by the processor,
wherein the processor is configured to execute a communication method, comprising:
measuring, by the terminal device, at least two channel state information reference signal (CSI-RS) resources or synchronization signal/physical broadcast channel (SS/PBCH) blocks selected from one or more resource settings configured for group-based SINR report;
calculating, by the terminal device, signal to interference noise ratios (SINRs) of CSI-RS resource indicators (CRIs) or SS/PBCH block resource indicators (SSBRIs) corresponding to the selected CSI-RS resources or SS/PBCH blocks according to the measurement results of the selected CSI-RS resources or SS/PBCH blocks; and
reporting, by the terminal device, the CRIs or SSBRIs and their SINRs to network device;
wherein the reported CRIs or SSBRIs are received simultaneously by the terminal and the interference measurement used for the SINR calculation of each reported CRI or SSBIR is based on the other reported CRIs or SSBIRs; and
wherein using the quasi co-location (QCL)-type D configured to NZP CSI-RS resource indicated by each reported CRI to measure NZP CSI-RS resources indicated by the other reported CRIs for interference measurement.

* * * * *